US012530976B2

(12) United States Patent
Ambühl et al.

(10) Patent No.: US 12,530,976 B2
(45) Date of Patent: Jan. 20, 2026

(54) METHOD TO OBTAIN A RECOGNIZED AIR PICTURE OF AN OBSERVATION SPACE SURROUNDING AN AUTOMATED AERIAL VEHICLE (71) Applicant: RUAG AG, Emmen (CH)

(72) Inventors: Daniel Ambühl, Adligenswil (CH); Christian Hohl, Winterthur (CH); Daniel Bohl, Emmenbrücke (CH); Konrad Rudin, Zürich (CH)

(73) Assignee: Ruag AG, Emmen (CH)

( * ) Notice: Subject to any disclaimer, the term of this patent is extended or adjusted under 35 U.S.C. 154(b) by 293 days.

(21) Appl. No.: 18/028,537

(22) PCT Filed: Aug. 26, 2021

(86) PCT No.: PCT/EP2021/073680
§ 371 (c)(1),
(2) Date: Mar. 25, 2023

(87) PCT Pub. No.: WO2022/063519
PCT Pub. Date: Mar. 21, 2022

(65) Prior Publication Data
US 2023/0360538 A1 Nov. 9, 2023

(30) Foreign Application Priority Data
Sep. 25, 2020 (EP) .................... 20198489

(51) Int. Cl.
G08G 5/25 (2025.01)
G08G 5/21 (2025.01)
(Continued)

(52) U.S. Cl.
CPC ................. G08G 5/25 (2025.01); G08G 5/21 (2025.01); G08G 5/723 (2025.01); G08G 5/80 (2025.01)

(58) Field of Classification Search
CPC ................. G08G 5/25; G08G 5/723
See application file for complete search history.

(56) References Cited

U.S. PATENT DOCUMENTS 9,536,435 B1 * 1/2017 Shay .................. G08G 5/21
11,250,711 B1 * 2/2022 Teague ............... G08G 5/80
(Continued)

FOREIGN PATENT DOCUMENTS

CN 106527483 A 3/2017
EP 3091525 A1 11/2016
(Continued)

OTHER PUBLICATIONS

CN106527483 (A) Machine Language Translation into English.

Primary Examiner — Peter D Nolan
(74) Attorney, Agent, or Firm — Lerner David LLP (57) ABSTRACT The present disclosure relates to a method of obtaining a recognized air picture of an observation space surrounding an automated aerial vehicle. The method comprises the steps of receiving first signals of first cooperative systems of aerial vehicles within the observation space using a first receiver on board the automated aerial vehicle and receiving second signals of second cooperative systems of aerial vehicles within the observation space using a second receiver on board the automated aerial vehicle. The first receiver and the second receiver are adapted to receive signals according to different protocols. The first signals and the second signals are processed using a processor on board the automated aerial vehicle to obtain tracking information with respect to the aerial vehicles within the observation space.

16 Claims, 2 Drawing Sheets (51) Int. Cl.
    *G08G 5/72*     (2025.01)
    *G08G 5/80*     (2025.01)

(56) References Cited

U.S. PATENT DOCUMENTS

| | | | |
|---|---|---|---|
| 2011/0295549 A1* | 12/2011 | Takabayashi | G01S 13/86 |
| | | | 702/142 |
| 2018/0170573 A1* | 6/2018 | Wang | G08G 5/26 |
| 2018/0348767 A1* | 12/2018 | Jafari Tafti | G08G 1/166 |
| 2019/0043367 A1* | 2/2019 | Wang | G01S 5/0027 |
| 2020/0027358 A1* | 1/2020 | Fine | G08G 5/723 |
| 2020/0162489 A1* | 5/2020 | Bar-Nahum | G08G 5/55 |
| 2020/0241144 A1 | 7/2020 | Dormiani | |
| 2020/0341136 A1* | 10/2020 | Wang | G01S 13/91 |
| 2020/0365042 A1* | 11/2020 | Mahalingam | G08G 5/55 |
| 2022/0268947 A1* | 8/2022 | Bindu Jyothikumar | |
| | | | G01S 19/51 |

FOREIGN PATENT DOCUMENTS

| | | |
|---|---|---|
| GB | 2450987 A | 1/2009 |
| WO | WO2017032906 A2 | 3/2017 |

\* cited by examiner

METHOD TO OBTAIN A RECOGNIZED AIR PICTURE OF AN OBSERVATION SPACE SURROUNDING AN AUTOMATED AERIAL VEHICLE

CROSS REFERENCE TO RELATED APPLICATIONS

This application is a national phase of international application PCT/EP2021/073680, filed Aug. 26, 2021, which claims the benefit of priority to European patent application EP20198491.5, filed 25 Sep. 2020, the content of both applications of which are herein incorporated by reference.

BACKGROUND OF THE INVENTION

Field of the Invention

The invention relates to a method to obtain a recognized air picture of an observation space surrounding an automated aerial vehicle. It further relates to an automated aerial vehicle.

Description of Related Art

Automated aerial vehicles (AAVs) include unmanned aerial vehicles (UAV) that are controlled by pilots situated in ground control stations. They further include manned aerial vehicles or personal air vehicles (also called Personal Vertical Take-Off Vehicles, Air-cars, Personal AirCrafts PAC, etc.). These vehicles may be automatically controlled (and/or controlled by a ground-based pilot), such that no on-board pilot is required.

The number of AAVs is steeply increasing. Measures need to be taken in order to avoid collisions and disruptions of the air traffic. They include support measures for pilots of pilot controlled AAVs situated in a ground control station but also the provision of autonomous detect and avoid (also called sense and avoid) capabilities to the AAV itself, which work even if the link between the AAV and the ground control station is (temporarily) broken.

Detect and avoid systems include cooperative detect and avoid (CDA) systems, based on actively emitted signals by the cooperative systems (e.g. transponder, FLARM, ADS-B out) situated on other aircraft, as well as non-cooperative detect and avoid (NCDA) systems, allowing for the detection of aircraft (and other airborne objects) that do not actively emit signals from cooperative systems. The present invention is directed to the field of cooperative detect and avoid (CDA) systems.

GB 2 450 987 B (EADS Deutschland GmbH) relates to a detect and avoid system using available on-board sensors (such as TCAS, radar, IR sensors and optical sensors) in order to make for itself an image of the surrounding airspace. The situation thus established is analyzed for imminent conflicts, i. e. collisions, TCAS violations or airspace violations. If a problem is detected, a hierarchical search for avoidance options is started, wherein the avoidance routes as far as possible comply with statutory air traffic regulations.

WO 2017/032906 A2 (Dronsystems Limited) relates to systems, methods and devices for automated Air Traffic Management for UAVs, especially small UAVs flying at low altitude, mostly in uncontrolled airspace. They include hardware installed on the UAV, which may comprise receivers for signals of cooperative systems in order to detect obstacles and taking avoiding actions in accordance with an automated collision avoidance mechanism.

EP 3 091 525 A1 (Airbus Defence and Space GmbH) also relates to methods and devices for an aircraft for handling potential collisions in air traffic. The method includes obtaining data from a cooperative collision avoidance system as well as from a sensor capturing non-cooperative as well as cooperative intruders.

Different types of aerial vehicles may be provided with different types of cooperative systems using different protocols. Some of the protocols include broadcast messages or positional data for the aerial vehicle, others do not. Accordingly, depending on the types of signals that are processed the resulting recognized air picture may be incomplete or the processing of the signals is non-trivial.

BRIEF SUMMARY OF THE INVENTION

It is the object of the invention to create a method to obtain a recognized air picture pertaining to the technical field initially mentioned, that allows for obtaining a complete recognized air picture, including as many cooperative aerial vehicles as possible, using equipment on-board an automated aerial vehicle.

The solution of the invention is specified by the features of claim 1. According to the invention the method comprises the steps of:
a) receiving first signals of first cooperative systems of aerial vehicles within the observation space using a first receiver on board the automated aerial vehicle;
b) receiving second signals of second cooperative systems of aerial vehicles within the observation space using a second receiver on board the automated aerial vehicle, the first receiver and the second receiver being adapted to receive signals according to different protocols;
c) processing the first signals and the second signals using a processor on board the automated aerial vehicle to obtain tracking information with respect to the aerial vehicles within the observation space.

Accordingly, an automated aerial vehicle preferably comprises
a) a first receiver for receiving first signals of first cooperative systems of aerial vehicles within an observation space surrounding the automated aerial vehicle,
b) a second receiver for receiving second signals of second cooperative systems of aerial vehicles within the observation space, and
c) a processor controlled to process the first signals and the second signals to obtain tracking information with respect to the aerial vehicles within the observation space.

The totality of tracking information with respect to all the captured aerial vehicles constitutes the recognized air picture.

Basically, each of the aerial vehicles may be tracked if the corresponding signal is received by the first or the second receiver. Nevertheless, at least some of the first signals and at least some of the second signals may relate to the same aerial vehicle, in particular to an aerial vehicle comprising two cooperative systems for transmitting different types of signals.

The first receiver and the second receiver may be combined in a single housing or they may be completely separate devices. More than two receivers may be provided, and, accordingly, signals from more than two receivers may be processed.

The method allows for tracking aerial vehicles being equipped by different kinds of cooperative systems, accordingly, the completeness of the (cooperative) recognized air picture will be improved. If several signals are available from the same aerial vehicle there will be a fallback option if one of the signal types cannot be received, e.g. due to a malfunction at the sending or receiving end or disrupted transmission. The tracking is done entirely on board the AAV, accordingly, the AAV is provided by the recognized air picture even in cases where there is no link to the ground control station.

Preferably, the first signals and the second signals are chosen from the following:
a) ADS-B signals;
b) FLARM signals; and
c) signals from active transponder interrogation;
i.e. receivers for at least two of these signals are provided. In particularly preferred embodiments, all three signal types may be received and processed. Further signal types are possible as well.

In principle, depending on the respective type of signal the signals may be broadcast signals (e.g. ADS-B and FLARM) or signals received after active transponder interrogation.

Preferably, signals received by the first receiver are processed to obtain the tracking information if available and signals received by the second receiver are processed only if no signals have been received by the first receiver within a predetermined time interval. If there are more than two types of receivers, the signals of the third receiver may be processed if neither the first nor the second receiver provides useable signals and so on.

In a preferred embodiment, receivers for ADS-B, for FLARM and for active transponder interrogation are available, wherein FLARM signals are processed if no ADS-B signals are available or if they are deemed to be unreliable. Signals from active transponder interrogation are processed if neither (useful) ADS-B nor FLARM signals are available.

Preferably, when processing the first signals and the second signals horizontal positional information and vertical positional information are obtained from the signals, a horizontal track estimation is generated from the horizontal positional information and a vertical track estimation is generated from the vertical positional information, independently from the generation of the horizontal track estimation.

The horizontal positional information includes ownship independent (absolute) position coordinates (x, y), ownship dependent (relative) position coordinates and/or range and/or bearing information. The horizontal positional information may be incomplete as in some cases only limited reliable information (e.g. range) is available.

The vertical positional information relates to the absolute or relative altitude of the aerial vehicle.

Independently tracking the aerial vehicles in the horizontal plane as well as in the vertical direction greatly reduces the computational load, and it has turned out that this does not lead to a substantial degradation of the track estimation, as horizontal and vertical movements of aerial vehicles are easily decoupled.

Preferably, the horizontal positional information is obtained from positional information included in the first signals and/or in the second signals and a two-dimensional horizontal track estimation is generated based on the included positional information.

The positional information included in the signals is preferably obtained from a positioning device located in the aerial vehicle and interacting with a positioning system such as GPS. Corresponding information is available e.g. in ADS-B or FLARM data. It is usually much more reliable than relative positional information, e.g. bearing and range relative to the ownship as obtained e.g. from active transponder interrogation.

Further information contained in the received signals may be employed to generate the track estimation, such as (inertial or relative) velocity vectors contained in FLARM and ADS-B signals.

Advantageously, the two-dimensional horizontal track estimation is based on a coordinated turn model (CT model), in particular if the underlying data is positional information included in the signals. A coordinated turn model assumes that an aerial vehicle (momentarily) travels along a circular path with constant speed and turn rate. Based on positional information (and velocity information, if available), the parameters of the CT model may be reliably determined, the track is regularly updated to include newly received positional information.

Especially in cases where the bearing information is rather imprecise, e.g. if it is based on signals obtained by transponder interrogation, the two-dimensional horizontal track estimation is preferably based on a continuous white noise acceleration model. Both methods may be used in parallel or in succession, depending on the available signals.

Range information may be determined from the first signals and/or the second signals, in particular from signals obtained from active transponder interrogation.

The range may be obtained from a transponder interrogation, based on the time-of-flight of the signals travelling between the ownship and the respective aerial vehicle. Similarly, an estimate for the bearing is obtained from a comparison of amplitudes or phases of signals received from several antennas positioned at the ownship, in a distance from each other.

In this case a range estimation is preferably generated based on the determined range information. Such a one-dimensional estimation is preferred vis-à-vis a two-dimensional estimation purely based on range and bearing data as bearing data is usually rather imprecise and shows large fluctuations. In addition, the distance between the ownship and other aerial vehicles is substantially more important for the risk assessment than the bearing.

Preferably, the range of an aerial vehicle as a function of time is modelled using a continuous Wiener process acceleration model (with a $3^{rd}$ order integrator).

Preferably, the two-dimensional horizontal track estimation and the range estimation are generated independently and in parallel, wherein the two-dimensional horizontal track estimation is prioritized for further processing, such that the range estimation is used only if no current two-dimensional horizontal track estimation is available. Accordingly, in such cases the range estimation provides a fall-back option in case the positional data is no longer available or reliable. Even if the two-dimensional horizontal track estimation has been used, previous information from the range estimation is always available such that a reliable range estimation is available immediately when switching from the two-dimensional estimation to range.

Preferably, the vertical movement of a tracked aerial vehicle as a function of time is modelled using a continuous white noise acceleration model (with a $2^{nd}$ order integrator).

The availability of more or less precise track information and estimations may be taken into account when classifying the threat posed by a certain aerial vehicle as described in more detail below.

In a preferred embodiment, the tracking information with respect to the aerial vehicles comprises a number of estimated tracks and each of the tracks is assigned to one of a fixed number of storage slots. A criticality value is assigned to each of the tracks. An estimated track having a lowest criticality value, stored in one of the storage slots is deleted when a new track with higher criticality value is to be assigned to a storage slot, if no free storage slots are available and if none of the existing tracks has expired.

Having a fixed number of slots ensures that the computational burden for subsequent processing steps based on the stored tracks, e.g. calculating and checking avoidance maneuvers, is within certain limits.

Preferably, the criticality value is a continuous value quantity such that the relevance of different tracks (and of aerial vehicles the tracks are associated with) may be assessed. Basically, the criticality value is high if the distance between the ownship and the aerial vehicle represented by the track is small and/or if the rate of closure is high etc. The criticality value is small if the vehicle is far away and/or if the rate of closure is small.

In a preferred embodiment, there is a fixed assignment between tracks and slots. New tracking information obtained from signals of the cooperative systems is used to update existing tracks or to initialize new tracks. For that purpose, it is checked whether the ID received with the signals matches an ID assigned to one of the existing tracks. As an alternative or as a fallback option an appropriately defined Mahalanobis distance is processed. If there is no ID match or no track has a sufficiently small Mahalanobis distance, a new track will be initialized.

As long as there are free slots, a new track may be assigned to any of the free slots. A track may be deleted and the corresponding slot released if there was no new data relating to that track for a certain time, i. e. the track has expired. As soon as there are no free slots available, the new track will be assigned to that slot storing the track with the lowest criticality value. Accordingly, this stored track will be deleted. In case the lowest criticality value of the stored track is higher than the criticality value of the newly discovered track, the stored track will be kept and the newly discovered track will not be assigned to any slot.

Preferably, positional information obtained from the first signals and the second signals is processed using an extended Kalman filter. This allows for generating useful track estimations. Other filters are possible, such as a linear Kalman filter or an unscented Kalman filter.

Preferably, one of a plurality of threat levels is assigned to each aerial vehicle identified in the tracking information. The threat levels correspond to discrete classes classifying in particular the risk that a certain aerial vehicle (represented by its track) collides with the ownship.

Preferably, in particular for AAVs controlled by ground-based pilots, the plurality of threat levels comprise at least a resolution advisory level and an automatic avoidance level. If an aerial vehicle is assigned the resolution advisory (RA) level, the pilot of the AAV will be alerted and requested to resolve the potential conflict with the aerial vehicle, in particular by commanding a suitable evasive maneuver (avoidance recommendation). If an aerial vehicle is assigned the automatic avoidance (AA) level, an evasive maneuver will be automatically commanded, in particular by hardware on-board the AAV, to avoid an imminent collision.

In a particularly preferred embodiment, the plurality of threat levels include the following:
i) OT: Other Traffic—the object is far away, and there is no need for action;
ii) PT: Proximate Traffic—the object is within a certain volume surrounding the AAV but poses no danger, there is no need for action;
iii) TA: Traffic Advisory—the object is in a critical volume surrounding the AAV, an alert is issued to the (ground) operator;
iv) RA: Resolution Advisory—the object is close, immediate action is required from the operator in order to resolve the conflict;
v) AA: Automatic Avoidance—the object is close and the autopilot is immediately instructed to start an avoidance maneuver.

Basically, the OT and PT threat levels may be combined into one because both require no specific reaction.

The threat levels may correspond to states in a state model or being assigned based on the (non-)fulfilment of certain conditions. The conditions to be fulfilled in order to transition from one threat level to another in the state model or in order to be assigned to a threat level may comprise one or more of the following:
a) a comparison of a distance between the ownship and the aerial vehicle (or the estimated track of the vehicle) with a threshold;
b) the availability of information and/or the accuracy of information (e.g. with respect to position, distance, speed etc.);
c) the activation of certain functions (e.g. automatic avoidance).

The distance threshold may be calculated from the current rate of closure between the ownship and the respective aerial vehicle, basically multiplying the rate of closure with a predetermined time parameter. When doing so, in order to avoid small distances when the rate of closure is small, the distance threshold may be modified. In particular, it may be required that a minimal distance always has to be respected, analog to distance modification (DMOD) in the context of TCAS.

It is not mandatory that the transitions are always between neighboring threat levels, but they may be between non-neighboring threat levels, i. e. threat levels lying in between may be skipped.

In order to avoid back-and-forth oscillations between threat levels, a certain hysteresis may be included in the conditions.

When assigning the threat level it may be taken into account whether the tracking information is incomplete and/or imprecise. In such a case the assignment may be based on a worst-case estimate. However, this may lead to a large number of false positives (i. e. unnecessary alerts and even unnecessary avoidance maneuvers). Accordingly, in other embodiments the assignment to a higher threat level happens only if the track information is sufficiently accurate to ascertain the (possible) conflict.

Preferably, at least some of the tracks are classified according to a relative geometry of the respective track and a flight path of the automated aerial vehicle.

Possible classes include:
traffic approach is head on;
traffic is being overtaken;
other.

An interference is classified as "head on" if the approach of the object and the AAV is fully or nearly frontal, i. e. the object approaches the AAV from a frontal direction. An interference is classified as "traffic is being overtaken" if the AAV approaches a slower object from behind.

When issuing an avoidance recommendation, the Rules of the Air are incorporated in such a way that the pilot is advised to avoid a collision doing a right turn if an object is classified as "head on" or "being overtaken". The same rules may be applied when commanding an automatic avoidance maneuver, or they may be ignored in that case, in order to ensure that a collision is reliably avoided even in the case of a close approach between the object and the AAV.

Further classes are possible, such as "traffic approach is overtaking", "converging" or "diverging".

Preferably, the first signals and the second signals are verified in order to exclude unphysical information from further processing. The verification includes range, altitude and ground speed of the aerial vehicle. As soon as any of these values is unphysical, the signal will be discarded. If there is no useable data from the given cooperative system within a predetermined time, data from another (fallback) cooperative system will be processed if available.

In addition to the physical parameters integrity or accuracy levels of the systems may be taken into account, if available (e.g. ADS-B).

Preferably, the first signals and the second signals are validated against positional information relating to aerial vehicles obtained from other sources. These sources include ground and/or on-board radar, optical sensors, etc. but also information obtained from other cooperative systems, including transponder interrogation. The validation allows for excluding in particular signals including positional information (e.g. ADS-B, FLARM) that have been generated abusively to deceive the detect and avoid system, e.g. by a cyber-attacker. Secondarily, it may help to detect malfunction.

Other advantageous embodiments and combinations of features come out from the detailed description below and the entirety of the claims.

BRIEF DESCRIPTION OF THE SEVERAL VIEWS OF THE DRAWINGS

Further advantages, features, and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination received, but also in other combinations on their own, without departing from the scope of the disclosure.

The appended drawings hereto support the description of the following detailed embodiments, wherein.

In the figures, the same components are given the same reference symbols.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that at least one of "A, B, and C" should not be understood as including only one of A, only one of B, only one of C, or any combination of A, B, and C.

Figure 1:
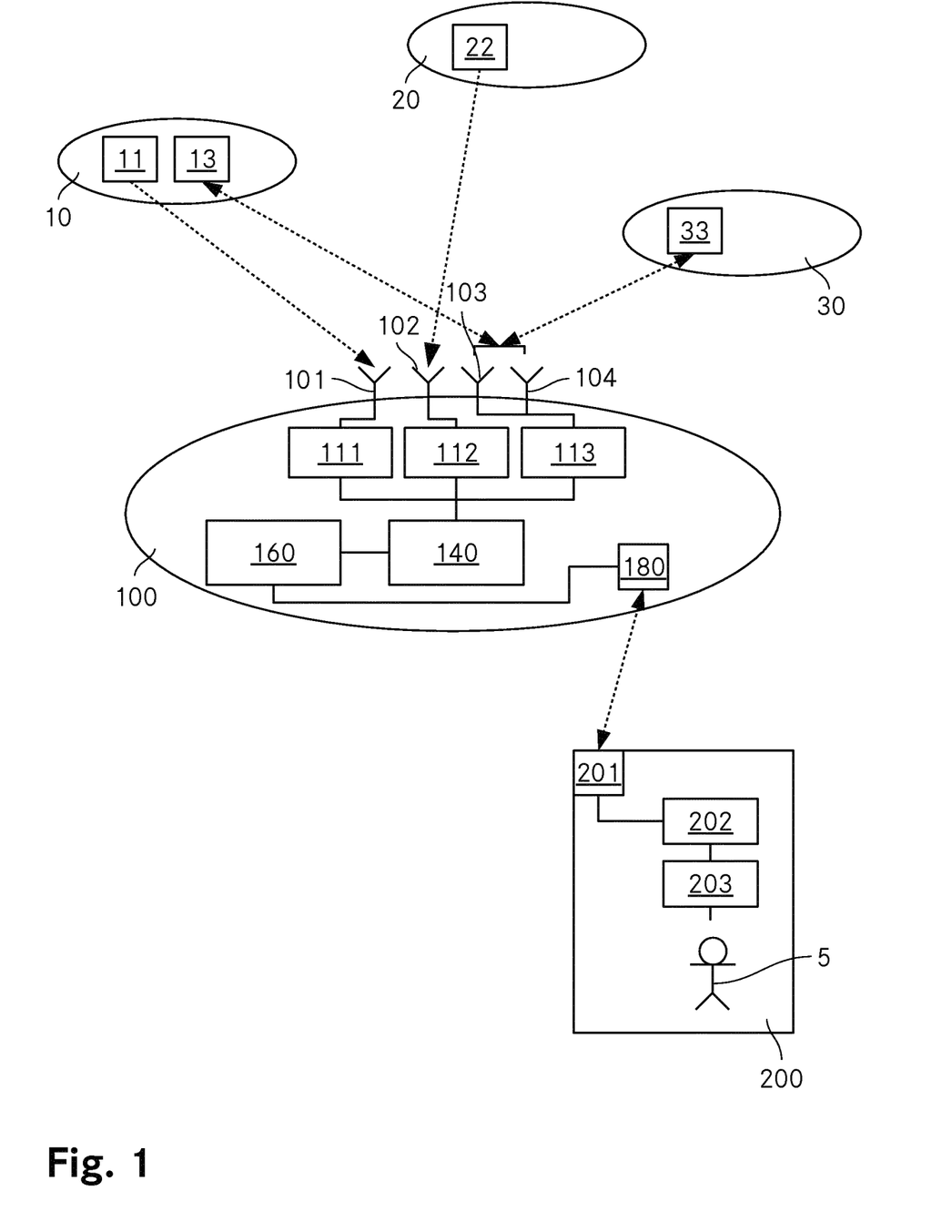
FIG. 1 depicts a schematic representation of an automated aerial vehicle according to the invention, communicating with a ground station and other aerial vehicles.
Figure 2:
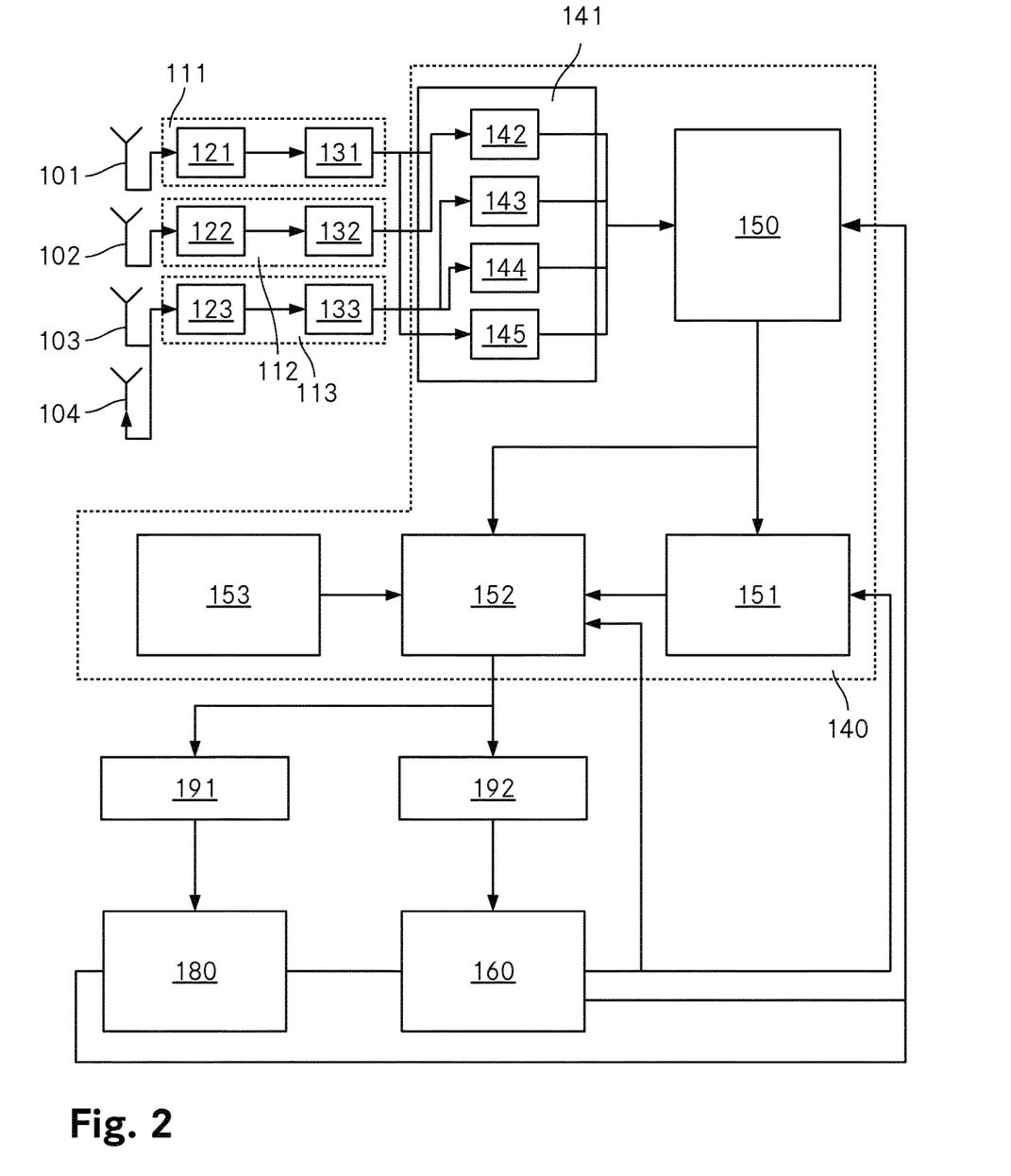
FIG. 2 depicts a block diagram for describing the inventive process.

The FIG. 1 is a schematic representation of an automated aerial vehicle according to the invention, communicating with a ground station and other aerial vehicles. The AAV is an unmanned aerial vehicle (UAV, ownship) 100. It features a number of antennas 101, 102, 103, 104 connected to several receiving units 111, 112, 113. As shown in FIG. 2, the receiving units 111, 112, 113 comprise a receiver 121, 122, 123 to process the signals received by the respective antenna(s) 101, 102, 103, 104 as well as a decoder 131, 132, 133 for obtaining data from the respective signal.

The first receiving unit 111 processes ADS-B (Automatic dependent surveillance—broadcast) signals that are broadcasted by respective cooperative systems 11 of aerial vehicles 10 such as airliners or general aviation aircraft. Positional information (including GPS position and altitude) are included within the signals and provided by the decoder 131 for further processing.

The second receiving unit 112 processes FLARM signals broadcasted by respective cooperative systems 22 of aerial vehicles 20 such as gliders, power gliders, small airplanes, helicopters or ultralight (microlight) planes. Again, the signals are broadcasted and include positional information that is decoded and provided by the decoder 132.

The third receiving unit 113 processes signals received from cooperative systems 13, 33 of different kinds of aerial vehicles 10, 30 in the context of active transponder interrogation. Altitude information may be embedded within the received signals and decoded and provided by the decoder 133. Range information is derived in the decoder 133 from the time-of-flight between the active interrogation and the received signals. Bearing information is obtained from the signals received by several antennae 103, 104 (usually, more than two antennae, e.g. four antennae, will be arranged at the AAV 100 in a distance from each other), derived by the decoder 133.

All decoded and derived positional information is transmitted to a processor 140 for further processing (described further below, in connection with FIG. 2). The processor 140 is linked to a control system 160 for controlling the AAV 100. In a manner known as such, the control system 160 includes a flight system and a mission system, controlling the AAV's components such as drives, sensors, communication units etc.

Inter alia, the control system 160 is linked to a communication system 180 for communicating with a ground station 200. Again, the ground station 200 is known as such, therefore there is no need to provide a detailed description thereof. It includes a communication interface 201, a processor 202 connected to the interface for processing the incoming and outgoing data, a human-machine interface (HMI) 203 for displaying information (including flight information, maps, the recognized air picture, the status of all systems, etc.) to and for receiving inputs (including piloting instructions) from an operator 5.

The FIG. 2 is a block diagram for describing the inventive process. For illustrative purposes and to provide a link to the system described in connection with FIG. 1, some steps of the process are visualized by functional units of the inventive AAV. It is to be noted that this does not mean that the actual components of the AAV need to correspond to these functional units.

The signals received by the antennae 101, 102, 103, 104 are transmitted to the respective receiving units 111, 112, 113 for processing. Processing includes steps such as filtering of and demodulation of the signals, done by receivers 121, 122, 123 as well as obtaining the signal content including positional information, identification numbers or codes, time or signal quality information etc., done by decoders 131, 132, 133. Further signals are received by several antennae 103, 104 in the context of active transponder interrogation. Range and bearing are derived from the signals as described above, by the corresponding decoder 133.

The information relating to positions (and possibly further motional quantities such as velocities) of other aerial vehicles is checked to fall within general pre-determined limits. These checks apply in particular to range, altitude and ground speed. The thus verified data is continuously fed to a filtering module 141, where the tracks are obtained and monitored by several filters 142, 143, 144, 145, as described in the following. The filters are implemented as extended Kalman filters, based on different models for the actual movement of the related objects, depending on the tracked quantities and the available data.

2-dimensional horizontal positional information from ADS-B and FLARM received from the receiving units 111, 112 is processed using a 2-dimensional coordinated turn model in filter 142. If 2-dimensional horizontal positional information is obtained from active transponder interrogation, based on the derived range, bearing and relative altitude provided by the receiving unit 113 together with the attitude of the ownship, it is processed using a 2-dimensional continuous white noise acceleration model in filter 143. For this processing, the data provided by receiving unit 113 are transformed into bearing and range defined in a local horizontal plane, using the ownship's attitude and the relative altitude. The measurement uncertainties are similarly transformed in this local horizontal plane by means of the so-called debiased converted measurement filter method (Y. Bar-Shalom, P. K. Willett, X. Tian: "Tracking and Data Fusion—A Handbook of Algorithms", 2011). Using the 2-dimensional continuous white noise acceleration model instead of the the coordinated turn model is due to the fact that information obtained from transponder interrogation is less precise than positional information obtained directly from the signals of the cooperative system as in the case of ADS-B and FLARM, and therefore it is not feasible to apply a coordinated turn model to such data.

Range information from active transponder interrogation is tracked by another filter 144, embodied as a continuous Wiener process acceleration model with a $3^{rd}$ order integrator.

Finally, altitude information obtained from any of the receiving units 111, 112, 113 is processed by a fourth filter 145 using a continuous white noise acceleration model with a $2^{nd}$ order integrator.

The altitude information obtained from cooperative systems is usually quantized. This is taken into account in the context of the Kalman filter as described in the following. The linear dynamics for the altitude of an aerial vehicle is described as $$x(k+1)=Ax(k)+Bu(k),$$

$$y(k)=Cx(k).$$

Due to the quantization effects the following non-linear measurement equation holds:

$$z(k)=Q(y(k)),$$

where Q is the quantization operator, a rounding operation in the most simple case:

$$Q(y) = \text{round}\left(\frac{y}{\Delta}\right) \cdot \Delta.$$

The estimation error e(k) of the filter is defined as follows:

$$e(k)=y(k)-y_p(k)=y(k)-Cx.$$

In order to take into account the quantization of the altitude information, the estimation error is quantized as well (cf. M. Fu: "Lack of Separation Principle for Quantized Linear Quadratic Gaussian Control", IEEE Transactions on Automatic Control, Vol. 57, Issue 9, Sept. 2012):

$$e^Q(k)=Q(e(k))=Q(y(k)-(Cx(k))).$$

This quantized error $e^Q(k)$ is used in the correction step of the filter.

The data received by the receiving units 111, 112, 113 are assigned to different intruders, if available, the assignment is based on the transmitted ID. If an ID is not available or in more general cases a suitably defined Mahalanobis distance taking into account other or further parameters is employed for assignment.

The data obtained from the relevant filters 142, 143, 144, 145 is processed in a recognized air picture (RAP) module 150 together with the state vector of the AAV obtained from the control system 160. This module includes inter alia a database comprising the storage slots for the tracks, storing the track information relating to the respective trajectories, the assigned IDs, the criticality values and flags relating to the availability of 2-dimensional horizontal information as well as vertical information. Accordingly, the information stored in the database constitutes the recognized air picture with respect to cooperative aerial vehicles. It is continuously updated based on the data obtained from the signals received by the receiving units 111, 112, 113 as well as from the ground station via the communication module 180.

In order to assign the intruders to the available storage slots, a continuous criticality value r is calculated for the intruder, based in particular on positional data and velocity data of the respective intruder and the ownship. For that purpose, two threat indices, a horizontal index $r_{hor}$ and a vertical index $r_{vert}$ are calculated as described in the following:

First of all, the minimal time up to a collision is calculated in horizontal ($\tau_{hor2D}$) and vertical ($\tau_{vert}$) direction as well as with respect to the range ($\tau_{range2D}$), where $$\tau_{hor} = \frac{d_{hor2D}}{-\dot{d}_{hor2D}},$$

$$\tau_{vert} = \frac{d_{vert}}{-\dot{d}_{vert}},$$

$$\tau_{range} = \frac{d_{range2D}}{-\dot{d}_{range2D}},$$

where the values of d denote the distance between the AAV and a given object and the values of $\dot{d}$ denote the rate of closure. The negative sign leads to the values being positive for approaching intruders.

The horizontal rate of closure is calculated as follows:

$$\dot{d}_{hor2D} = \frac{x_N^{rel} \cdot v_N^{rel} + x_E^{rel} \cdot v_E^{rel}}{d_{hor2D}}.$$

The values of τ are mapped to a range between 0 and 1 using piecewise affine functions as follows:

$$r_\tau(\tau) = \begin{cases} 1, & 0 \le \tau \le \tau_{min} \\ 1 - \frac{\tau - \tau_{min}}{\tau_{max} - \tau_{min}}, & \tau_{min} < \tau \le \tau_{max} \\ 0, & \tau \ge \tau_{max} \text{ or } \tau < 0 \end{cases}$$

where the parameters $\tau_{min}$, $\tau_{max}$ are freely selected to tune the behaviour of the mapping. A value of $\tau_{min}=0$ leads to a high selectivity even at small values of τ.

For each the horizontal and vertical direction as well as range, a second index is calculated based on the distance d mapped to the range between 0 and 1:

$$r_d(d) = \begin{cases} 1, & d \le d_{min} \\ 1 - \frac{d - d_{min}}{d_{max} - d_{min}}, & d_{min} < d \le d_{max} \\ 0, & d \ge d_{max} \end{cases}$$

Again, the parameters $d_{min}$, $d_{max}$ are freely selected to tune the behaviour of the mapping.

The pairs of indices are combined as follows to obtain the two threat indices mentioned above:

1. If track information for the range is available:

$r_{hor} = \max(r_{d,range2D}, r_{\tau,range2D})$

2. If no track information for the range is available but horizontal track information:

$r_{hor} = \max(r_{d,hor2D}, r_{\tau,hor2D})$

3. If neither range nor horizontal track information is available:

$r_{hor} = 0.0$ (this means that an intruder without range or horizontal information is irrelevant).

4. If vertical track information is available:

$r_{vert} = \max(r_{d,vert}, r_{\tau,vert})$,

5. If no vertical track information is available $r_{vert} = 1.0$ (this means that an intruder without altitude information is considered to be critical).

The criticality value r is calculated as the geometric mean of the two indices:

$r = \sqrt{r_{hor} \cdot r_{vert}}$.

For each intruder it is checked whether essentially simultaneous information is obtained from more than one of the receivers, due to the fact that the corresponding aerial vehicle features more than one cooperative system (as for example aerial vehicle 10 featuring an ADS-B as well as a transponder). If this is the case, the data of only one of the systems is used, chosen according to a predetermined priority. In the described example, ADS-B is preferred to FLARM and FLARM is preferred to active transponder interrogation.

Monitored tracks of intruders are stored in a fixed number of storage slots, where one track is assigned to one slot. If new data cannot be assigned to an existing track (e.g. because a corresponding ID is not among the IDs assigned to the existing tracks) it is checked whether a free slot is available. If this is the case, a new track is initialized with the data. If no slot is available, the criticality value of the intruder is compared with the criticality value of the existing tracks. If at least one of the existing tracks has a lower criticality value (corresponding to a lower risk of an incident) the one existing track with the lowest criticality value is deleted and the new track, initialized with the data, is stored in the corresponding storage slot. If none of the existing tracks has a lower criticality value, no new track is initialized and the data is discarded.

A maintenance function continually ensures that tracks that have not been updated for a predetermined time are automatically deleted, thereby freeing the corresponding storage slot.

To each of the detected objects, represented by their respective track, a threat level is assigned in classification module 151, based on the information obtained from the RAP module 150 as well as flight information of the ownship provided by the control system 160. In addition, all objects are classified according to the geometry of the interference with the AAV, comprising all relevant conditions of the ICAO Rules of the Air.

The threat levels are chosen in analogy to TCAS II, V7.1. In addition to the corresponding states a further level, Automatic Avoidance, is introduced. Accordingly, the threat levels are as follows:

i) OT: Other Traffic—the object is far away, and there is no need for action;

ii) PT: Proximate Traffic—the object is within a certain volume surrounding the AAV but poses no danger, there is no need for action;

iii) TA: Traffic Advisory—the object is in a critical volume surrounding the AAV, an alert is issued to the (ground) operator;

iv) RA: Resolution Advisory—the object is close, immediate action is required from the operator in order to resolve the conflict, for that purpose an avoidance recommendation message 191 is sent to the operator (cf. FIG. 2);

v) AA: Automatic Avoidance—the object is close and the autopilot is immediately provided with instructions 192 for starting an avoidance maneuver (cf. FIG. 2).

The threat levels are characterized by the parameters τ, a time up to the Closest Point of Approach (CPA), and DMOD, a minimum distance that needs to be respected besides a certain minimum value of τ. In principle, the criteria on both parameters may be varied according to a Sensitivity Level (which may depend in particular from the altitude of the ownship). Alternatively, the criteria on the parameters may be fixed. Automatic Avoidance may be switched on or off, i. e. if it is switched off, the threat level will not be changed to AA and the operator is responsible for commanding the avoidance maneuvers.

(In a variant, the threat level will still be changed to AA if it is established at the AAV that the link with the ground station is currently lost.).

For the classification of the traffic, in a first step the maximum distances of the Protection Volumes $d_{hor}^x$, $d_{ver}^x$ are calculated for each of the threat levels x. In a second step, based on the threat level determined in the previous time step, the limits of the lower and equal threat levels are increased, using a hysteresis parameter $\text{Hyst}_y^x$, where y denotes hor or ver:

$$d_y^x \cdot (1+\text{Hyst}_y^x),$$

where the values of the hysteresis parameter $\text{Hyst}_y^x$ may be chosen in a range of $0 \leq \text{Hyst}_y^x < 1$. Setting a non-zero hysteresis parameter helps avoiding too many back-and-forth changes of the classification level. In principle, it increases the protection volume that shall not be violated if the threat level shall be reduced.

Finally, it is ensured that the threat level AA is maintained until the relevant intruder may be assigned to threat level PT. This is done by checking whether the threat level in the previous time step was AA. If this is the case, the limits of the threat level AA are set to the value of the threat level TA, such that a transition to threat level TA is prohibited.

As soon as the limits are known, the traffic is classified according to these limits into the highest possible threat level.

For the sake of classification, the "protection volumes", distances, velocities and finally the threat level are calculated for each of the tracked aerial vehicles. The threat level is calculated also in the case where the recognized air picture is incomplete. As a minimum, a horizontal range should be known to be able to determine the threat level. If no altitude information is available, the classification is based purely on the horizontal information. As soon as altitude information becomes available, the vertical criteria are considered as well.

The track information stored in the database of the RAP module 150 is provided with flags indicating the availability of different elements of the track information, such as horizontal range and its time derivative and relative altitude of the aerial vehicle and its time derivative. Horizontal range information is obtained from the range filter 144 (for transponder interrogation data) or from the horizontal filter 142 (for FLARM and ADS-B data), wherein slant range is converted to horizontal range, taking into account the relative altitude. If relative altitude information is not available it will be assumed that the aerial vehicle is on the same altitude as the AAV (worst case scenario).

As in the context of TCAS, the range parameter is modified in order to avoid small distances when the rate of closure is small. The horizontal rate of closure is obtained from the traffic filter:

$$d_{hor} = r$$

$$\dot{d}_{hor} = -\dot{r}$$

In the vertical direction, the relations are as follows:

$$x_{rel}^D(t) = x_{TFC}^D(t)$$

$$v_{rel}^D(t) = v_{TFC}^D(t) - v_{UAV}^D(t)$$

$$d_{ver} = |x_{rel}^D(t)|$$

$$\dot{d}_{ver} = -sgn(x_{rel}^D(t)) \cdot \dot{x}_{rel}^D(t) = -sgn(x_{rel}^D(t)) \cdot v_{rel}^D(t)$$

The horizontal and vertical distance from the protection volume for RA (and analogously for TA and AA) are calculated as follows:

$$d_{hor}^{RA} = \max(DMOD^{RA}, \tau^{RA} \cdot \max(0, \dot{d}_{hor})),$$

$$d_{ver}^{RA} = \max(AltThr^{RA}, \tau^{RA} \max(0, \dot{d}_{ver})),$$

where AltThr is the altitude threshold, corresponding to the DMOD for vertical approach. As an example, in the context of TCAS Sensitivity Level 3, the values for the parameters are

| threat level | τ | DMOD | AltThr |
| --- | --- | --- | --- |
| RA | 15 s | 0.2 NM | 600 ft |
| TA | 25 s | 0.33 NM | 850 ft |

When classifying the aerial objects according to their threat levels it is considered whether the input data are complete. For that purpose it is assumed that the data of the traffic filter are accurate as long as a corresponding flag assigned to an object is set to "is Available". If an object is set to "not Available" the threat level of this object is set to OT.

In addition, a state vector of the AAV is employed. If the state vector has not been updated within a time interval or if its data are not valid the last known state vector is used for the classification. If no useable information on the state vector is available for a defined time all traffic is set to OT as a meaningful classification is not possible without knowledge of the current state of the AAV itself.

The classification of the objects according to the geometry of the interference with the AAV assigns every tracked aerial vehicle to one of three classes, namely traffic approach is head on;
traffic is being overtaken;
other.

An interference is classified as "head on" if the approach of the object and the AAV is fully or nearly frontal, i. e. the object approaches the AAV from a frontal direction. This is assumed if the following criteria are fulfilled:
  i. the position of the object is within a circular segment defined by a predetermined angle, about the inertial velocity vector above ground of the AAV;
  ii. the velocity vector of the object relative to the AAV above ground is within a further predetermined angle about a line connecting the AAV and the object;
  iii. the course difference between the AAV and the object is more than 90° or less than −90°.

An interference is classified as "traffic is being overtaken" if the following criteria are fulfilled:
  i. the position of the object is within a circular segment defined by a predetermined angle about the inertial velocity vector of the AAV;
  ii. the velocity vector of the object relative to the AAV above ground is within a further predetermined angle about a line connecting the AAV and the object;
  iii. the difference in course of the AAV and the object is less than 90° or more than −90°.

Other overtaking maneuvers may be designated as "left oblique overtaking" or "right oblique overtaking". They are not specifically handled in the context of the described system.

Further classes are possible, such as "traffic approach is overtaking", "converging" or "diverging".

For generating appropriate avoidance recommendation messages 191 as well as instructions 192 for automatic avoidance maneuvers the data obtained by the RAP module 150 as well as from the classification module 151, as well as data on the AAV and further data received from further sources such as a terrain model 153 and the control system 160 are processed by a generation module 152 for generating avoidance trajectories.

In principle, these trajectories may be generated by defining a set of candidate trajectories and checking which of the candidate trajectories avoid a possible collision indicated by an RA or AA threat level. As a matter of course, avoidance is not only checked against the aerial vehicle which was the cause for the identified threat but against all the tracked vehicles and conflicts with terrain. If several suitable trajectories are identified, the one best fulfilling additional criteria may be chosen for the avoidance recommendation message 191 or the instructions 192 for an automatic avoidance maneuver. Other known methods for the generation of avoidance trajectories may be employed in generation module 152.

When issuing an avoidance recommendation message 191, the Rules of the Air are incorporated in such a way that the pilot is advised to avoid a collision doing a right turn if an object is classified as "head on" or "being overtaken". In order to ensure that a collision is reliably avoided even in the case of a close approach between the object and the AAV, the Rules of the Air are not taken into account for the instructions 192 for automatic avoidance maneuvers.

The invention is not limited to the described embodiment. Various details of the process as well as of the system may be embodied differently.

In summary, it is to be noted that the invention creates a method to obtain a recognized air picture that allows for obtaining a complete recognized air picture, including as many cooperative aerial vehicles as possible, using equipment on-board an automated aerial vehicle.

Since the devices and methods described in detail above are examples of embodiments, they can be modified to a wide extent by the skilled person in the usual manner without departing from the scope of the invention. In particular, the mechanical arrangements and the proportions of the individual elements with respect to each other are merely exemplary. Some preferred embodiments of the apparatus according to the invention have been disclosed above. The invention is not limited to the solutions explained above, but the innovative solutions can be applied in different ways within the limits set out by the claims.

The invention claimed is:

1. A method of obtaining a recognized air picture of an observation space surrounding an automated aerial vehicle, the method comprising the steps of,
   a) receiving first signals of first cooperative systems of aerial vehicles within the observation space using a first receiver on board the automated aerial vehicle;
   b) receiving second signals of second cooperative systems of aerial vehicles within the observation space using a second receiver on board the automated aerial vehicle, the first receiver and the second receiver being adapted to receive signals according to different protocols;
   c) processing the first signals and the second signals using a processor on board the automated aerial vehicle to obtain tracking information with respect to the aerial vehicles within the observation space and obtaining horizontal positional information and vertical positional information from the processed first and second signals; and
   d) generating a horizontal track estimation from the horizontal position information, and generating a vertical track estimation from the vertical positional information independently from the generation of the horizontal track estimation.

2. The method as recited in claim 1, wherein the first signals and the second signals comprise one of:
   a) ADS-B signals
   b) FLARM signals; and
   c) signals from active transponder interrogation.

3. The method according to claim 1, wherein signals received by the first receiver are processed to obtain the tracking information if available and that signals received by the second receiver are processed only if no signals have been received by the first receiver within a predetermined time interval.

4. The method according to claim 1, wherein the generated horizontal track estimation is a two-dimensional horizontal track based on positional information included in at least one of the first signals and second signals.

5. The method claim 4, wherein the two-dimensional horizontal track estimation is based on a coordinated turn model.

6. The method claim 4 wherein the two-dimensional horizontal track estimation is based on a continuous white noise acceleration model.

7. The method according to claim 1, wherein range information is determined from at least one of the first signals and the second signals, and the method further comprises the steps of generating a range estimation based on the determined range information.

8. The method according to claim 7,
   wherein the horizontal positional information is obtained from positional information included in at least one of the first signals and the second signals and the horizontal track estimation generated based on the positional information included in at least one of the first signals and the second signals is a two-dimensional horizontal track estimation, and
   the method further comprises the steps of:
      generating independently and in parallel the two-dimensional horizontal track estimation and the range estimation, and
      prioritizing for further processing the two-dimensional horizontal track estimation such that the range estimation is used only if no current two-dimensional horizontal track estimation is available.

9. The method according to claim 7, wherein the range information is determined from signals obtained from active transponder interrogation.

10. The method according to claim 1, wherein:
   the tracking information with respect to the aerial vehicles comprises a number of estimated tracks, each of the tracks assigned to one of a fixed number of storage slots, and the method further comprises the steps of assigning a criticality value to each of the tracks, and deleting an estimated track having a lowest criticality value and stored in one of the storage slots when a new track with higher criticality value is to be assigned to a storage slot, no free storage slots are available and none of the existing tracks have expired.

11. The method according to claim 1, further comprising the steps of processing positional information obtained from the first signals and second signals using an extended Kalman filter.

12. The method according to claim 1, further comprising the steps of assigning one of a plurality of threat levels to each aerial vehicle identified in the tracking information.

13. The method according to claim 12, wherein the plurality of threat levels comprise at least a resolution advisory level and an automatic avoidance level.

14. The method according to claim 1, further comprising the steps of classifying at least some of the aerial vehicles according to a relative geometry of their respective horizontal track estimation and vertical track estimation and a flight path of the automated aerial vehicle.

15. The method according to claim 1, further comprising the steps of validating that the first signals and the second signals against positional information relating to aerial vehicles obtained from other sources.

16. An automated aerial vehicle, comprising
 a) a first receiver configured to receive first signals of first cooperative systems of aerial vehicles within an observation space surrounding the automated aerial vehicle,
 b) a second receiver configured to receive second signals of second cooperative systems of aerial vehicles within the observation space, and
 c) a processor configured to process the first signals and the second signals to obtain tracking information with respect to the aerial vehicles within the observation space, and wherein the processor is configured to obtain horizontal positional information and vertical positional information from the signals, to generate a horizontal track estimation from the horizontal positional information and to generate a vertical track estimation from the vertical positional information, independently from the generation of the horizontal track estimation, and to store the horizontal track estimation and the vertical track estimation of the air vehicles into storage slots of a database of a recognized air picture module.

\* \* \* \* \*